3,228,937
ADENINE DERIVATIVE
William E. Adcock, Modesto, Calif., assignor to Shell Oil Company, New York, N.Y., a corporation of Delaware
No Drawing. Filed July 17, 1963, Ser. No. 295,804
1 Claim. (Cl. 260—252)

This invention relates to a novel compound which has been found to alter profoundly growth and decay processes of plant tissues.

This new compound is 6-benzylamino-9-(tetrahydropyran-2-yl)-9H-purine, and can be represented by the formula:

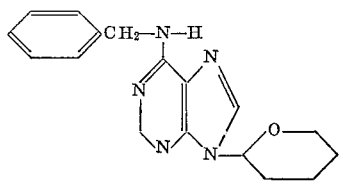

This compound suitably can be prepared as follows ("parts" meaning parts by weight unless otherwise indicated, with parts by weight bearing the same relation to parts by volume as does the kilogram to the liter):

10 parts of 6-benzylaminopurine, 11.2 parts of 2,3-dihydro-4H-pyran and 0.8 part of p-toluenesulfonic acid were added to 150 parts by volume of dry ethylene glycol dimethyl ether and the resulting suspension was heated, with stirring, under reflux. After 7.5 hours, all of the solids had dissolved. The solvent was removed under reduced pressure at 40° C. to give a viscous oil. This oil was dissolved in 125 parts by volume of benzene and the solution washed with a dilute sodium hydroxide solution, then with water. The solution then was dried with magnesium sulfate and the benzene was removed by distillation. The resulting yellow oil was treated with a 5:1 mixture of petroleum ether and benzene to give 11 parts (78% of theory) of crystalline product, melting point: 108–110° C. The identity of the product was established by elemental analysis as 6-benzylamino-9-(tetrahydropyran-2-yl)-9H-purine:

Calculated, percent by weight for $C_{17}H_{19}N_5O$: C, 66.0; H, 6.2; N, 22.6. Found: C, 66.6; H, 6.4; N, 22.8.

The identity of the product was confirmed by infra-red spectrum analysis.

This novel compound has been found to affect profoundly the growth and decay processes of plant tissues. It has been found that the compound alters the metabolism of excised green, leafy plant tissue in such a way that for several days the tissue maintains a metabolism akin to that before excision, rather than the metabolism characteristic of dying tissue. Application of the novel compound to such leafy, green plant tissue thus has the effect of delaying senescence of the tissue, thus preserving the tissue. As a practical matter, the compound of the invention can be used to preserve leafy green vegetables, delaying wilting and decay.

The effect of the compound of this invention upon excised leafy, green plant tissue was demonstrated as follows:

Vegetables purchased at a market were washed in aqueous solutions of the compound of the invention and then stored in open plastic bags at 70° F. and 100% relative humidity. After 5 days the percent of green leaf area was estimated in comparison with a standard. Controls were run in parallel tests. Table I summarizes average readings on the vegetables for various concentrations of the compound of this invention in the solutions they were washed in.

TABLE I

| Concentration [1] | Percent Green Color | | | | |
|---|---|---|---|---|---|
| | Kale | Parsley | Turnip Greens | Brussel sprouts | Celery |
| 0(control) | 50 | 70 | 50 | 8 | 10 |
| 1.0 | | | | 72 | |
| 2.5 | 90 | 90 | 80 | 94 | |
| 5.0 | 90 | 90 | | 100 | |
| 10.0 | 100 | 80 | 80 | | 50 |
| 100.0 | | 90 | 80 | | 90 |

[1] Parts per million by weight of the solution.

This data shows the marked anti-senescence effect of the compound of the invention with respect to leafy green vegetables.

Further, it has been found that the compound of the invention has the usual effect of increasing the growth of fruit, particularly of grapes, this property of the compound being most strikingly demonstrated by the results of the following experiment:

Clusters of blooms of Black Corinth grapes were dipped into aqueous solutions of the compound of the invention. The blooms were about 4 days old, but had not yet begun to shatter. A small amount of a detergent was added as a wetting agent. Controls were conducted. Approximately 2½ months later the grapes were harvested. It was found that the controls had a high percentage set of small berries, while those treated with the compound of the invention also had a high percentage set, with the berries much larger than those in the controls—the berries which developed from blooms which had been treated with a solution containing 1000 parts per million by weight of the compound of the invention were about three times as large as the berries of the controls. The effect of the compound of the invention on the development of the berries is shown in the following table.

TABLE II

| Concentration of test compound, p.p.m.: | Average weight per berry grams |
|---|---|
| 0 (control) | 0.23 |
| 10 | 0.26 |
| 100 | 0.38 |
| 1000 | 0.62 |

The compound of the invention thus markedly increased the yield of grapes in the treated clusters.

I claim as my invention:
6-benzylamino-9-(tetrahydropyran-2-yl)-9H-purine.

No references cited.

NICHOLAS S. RIZZO, *Primary Examiner.*